United States Patent
Balko

(10) Patent No.: US 8,689,060 B2
(45) Date of Patent: Apr. 1, 2014

(54) PROCESS MODEL ERROR CORRECTION

(75) Inventor: Soeren Balko, Weinheim (DE)

(73) Assignee: SAP AG, Walldorf (DE)

( * ) Notice: Subject to any disclaimer, the term of this patent is extended or adjusted under 35 U.S.C. 154(b) by 226 days.

(21) Appl. No.: 13/296,858

(22) Filed: Nov. 15, 2011

(65) Prior Publication Data

US 2013/0124927 A1    May 16, 2013

(51) Int. Cl.
*G06F 11/00* (2006.01)

(52) U.S. Cl.
USPC .......................................... 714/48; 705/7.27

(58) Field of Classification Search
USPC .......................................... 714/48; 705/7.27
See application file for complete search history.

(56) References Cited

U.S. PATENT DOCUMENTS

| 7,467,371 | B1 * | 12/2008 | Meredith et al. ............. 717/104 |
| 2009/0112663 | A1 * | 4/2009 | Benayon et al. ................ 705/7 |
| 2009/0113380 | A1 * | 4/2009 | Ploesser et al. ............. 717/104 |
| 2011/0307405 | A1 * | 12/2011 | Hammer et al. ............. 705/331 |
| 2012/0066662 | A1 * | 3/2012 | Chao et al. .................... 717/104 |
| 2012/0078677 | A1 * | 3/2012 | Green et al. ................. 705/7.26 |

OTHER PUBLICATIONS

OMG, "Business Process Model and Notation (BPMN)" Version 2.0, dated Jan. 2011, OMG Document No. formal/Jan. 3, 2011, 538 pages.

Balko, Sören, SAP, Workflow Pattern Coverage in SAP Netweaver BPM 7.11, Created May 28, 2009, 46 pages.

* cited by examiner

*Primary Examiner* — Yolanda L Wilson
(74) *Attorney, Agent, or Firm* — Fish & Richardson P.C.

(57) ABSTRACT

A method for providing corrections for semantic errors in a process model can be implemented on a computer. The method can include identifying a change in the process model, the process model including one or more process model elements. The method can also include identifying one or more constraint violations for at least one of the one or more process model elements, and identifying one or more correction proposals for each constraint violation identified.

13 Claims, 13 Drawing Sheets

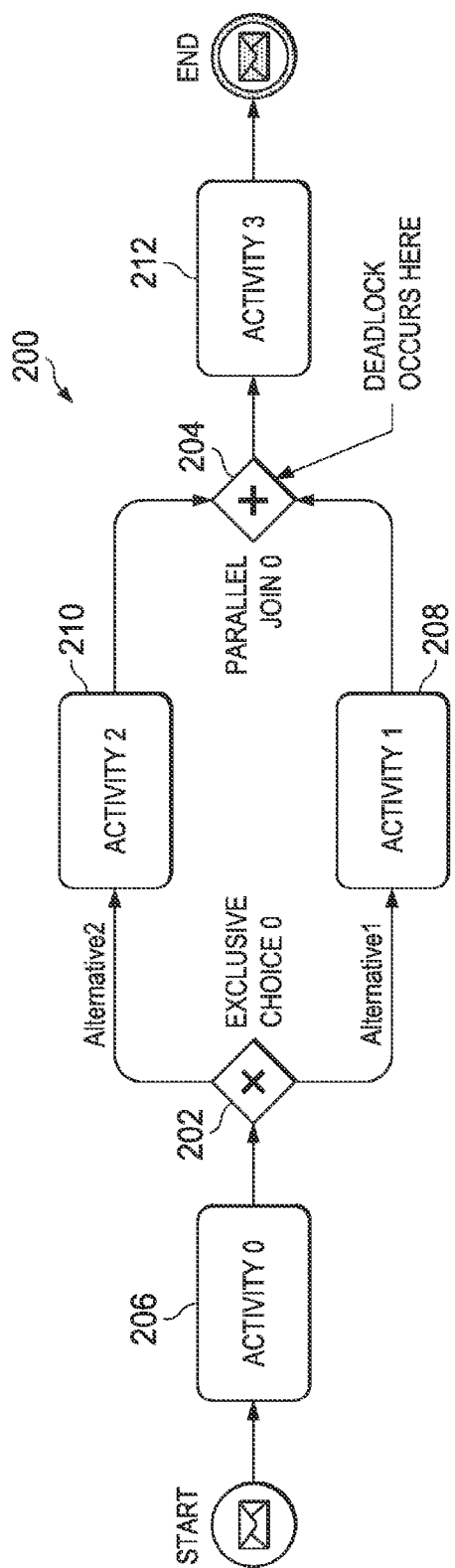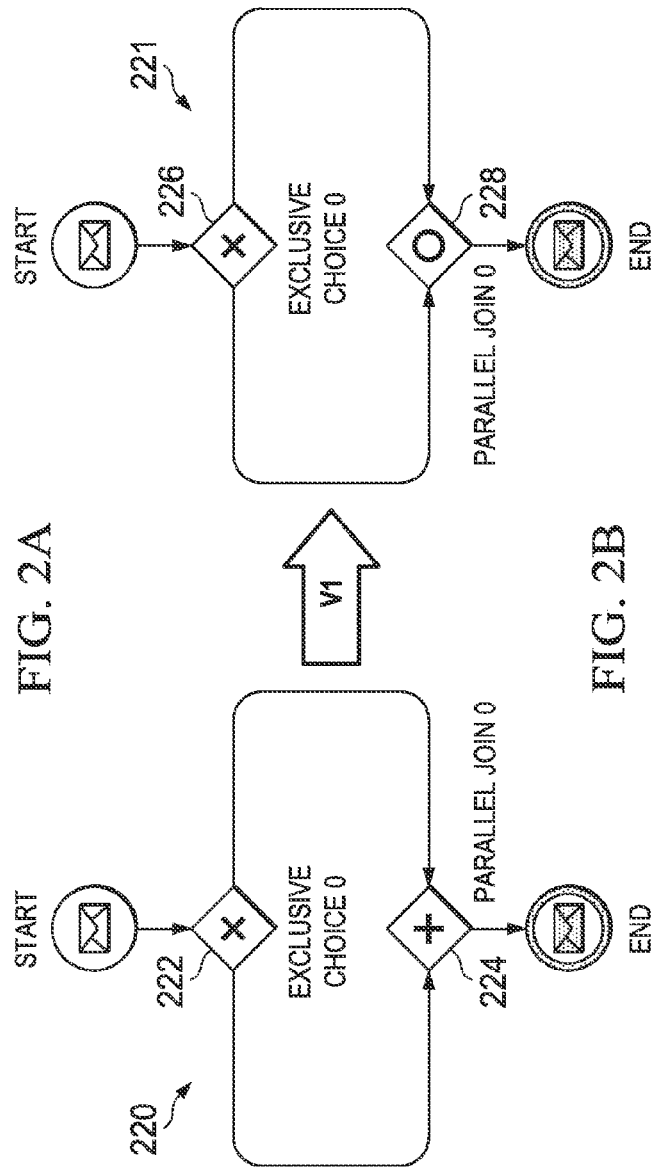
FIG. 2A
FIG. 2B

PROCESS MODEL ERROR CORRECTION

TECHNICAL FIELD

This invention relates to business process modeling, and more particularly to correction of semantic errors of process models.

BACKGROUND

Process modeling is an error-prone task in which design flaws may lead to errant runtime behavior. Such design flaws may result in a number of undesirable effects both in the Business Process Management System (BPMS) runtime and connected applications. For example, inconsistent application states, security violations, service level agreements (SLAs) and Key Performance Indicators (KPIs) not being reached, or a failure to terminate, etc., may occur.

SUMMARY

Certain aspects of the disclosure include a computer implemented method for providing corrections for semantic errors in a process model. Implementations of the computer implemented method may include identifying a change in the process model, the process model including one or more process model elements. One or more constraint violations may be identified for at least one of the one or more process model elements. One or more correction proposals can be identified for each constraint violation identified.

Certain aspects of the disclosure include a system for providing corrections for semantic errors in a process model. Implementations of the system include a memory for storing instructions and at least one hardware processor configured to execute instructions. The instructions may include identifying a change in the process model, the process model including one or more process model elements, identifying one or more constraint violations for at least one of the one or more process model elements, and identifying one or more correction proposals for each constraint violation identified.

Certain aspects of the disclosure include a computer program product, tangibly embodied in an information carrier, and include instructions that, when executed, cause a processor to perform operations. In certain implementations, the operations may include identifying a change in the process model, the process model including one or more process model elements. The operations may also include identifying one or more constraint violations for at least one of the one or more process model elements and identifying one or more correction proposals for each constraint violation identified.

In certain instances of the implementations, a severity of the constraint violation can be identified. At least one of the one or more correction proposals can be applied automatically for constraint violation severities that indicate a runtime error.

In certain implementations, a severity of the constraint violation can be identified, and approval of at least one of the one or more correction proposals for constraint violation severities that indicate that a run-time error is possible can be requested.

In certain implementations, a bit string representative of the at least one of the one or more process model elements for which a constraint violation was identified can be created. The bit string may be a fingerprint of a process model fragment, uniquely representing the state of the process model fragment. In certain instances, the bit string may be a checksum. In certain implementations, the bit string is a first bit string, and the method may also include receiving a user confirmation of a correction proposal from the one or more correction proposals, the user confirmation establishing a selected correction, and recreating the bit string to create a new bit string of a current version of the at least one of the one or more process model elements for which a constraint violation was identified. The bit string may be compared to the new bit string. If the new bit string differs from the first bit string, the selected correction may be discarded. If the new bit string is the same as the first bit string, the selected correction may be applied.

The details of one or more embodiments of the invention are set forth in the accompanying drawings and the description below. Other features, objects, and advantages of the invention will be apparent from the description and drawings, and from the claims. For example, modeling error detection algorithms may be used as a baseline technology to (i) detect erroneous situations, and (ii) relate them to the causing process fragments. In addition, the proposed invention generates one or more correction proposals that it may later materialize or implement to rectify the detected modeling error. The systems, methods, and computer program products described herein can (i) apply correction proposals on top of a graphical process modeling language like Business Process Modeling Notation (BPMN), (ii) support both a single-user and a multi-user (e.g., sequential or concurrent usage) modeling environment, and (iii) rectify semantic issues (such as "Deadlock"s), as opposed to syntactical problems. Specifically, syntactical problems can be automatically detected by checking a process model against a meta model (such as the BPMN 2.0 meta model as defined in the standards document).

The error correction can be used for several purposes. For example, error correction can provide an extensible process model correction framework that is integrated into a design time environment. By early detection of erroneous situations (i.e., at design time or before a process model is deployed into a runtime environment such as a Quality Assurance/test system), the total cost of process development can be lowered. Error correction can also automatically correct typical process model errors such as "Deadlock," "Lack of Synchronization," "Cycle in Diverging Gateway," and violated "Four-Eyes-Principle." Error correction may either happen autonomously or may involve a modeling person who would confirm a correction before it is applied (i.e., interactively). Error correction of the present disclosure supports both a single-user and multi-user modeling environment, thus, is applicable to traditional check-out/submit style process modeling and collaborative process modeling, where multiple people edit a process model at the same time. Single user applications versus multiple user applications, as well as the check-out/submit style (e.g., traditional versioning mechanisms, employed in source code repositories such as CVS, Subversion, GIT, etc.) and concurrent/collaborative modeling are mostly orthogonal aspects.

DESCRIPTION OF DRAWINGS

FIG. 2A is a schematic of an example process model showing a "Deadlock" constraint violation.

FIG. 2B is a schematic representation illustrating a first variant (Variant 1) of a correction proposal for the "Deadlock" shown in FIG. 2A.

Like reference symbols in the various drawings indicate like elements.

DETAILED DESCRIPTION

Figure 1:
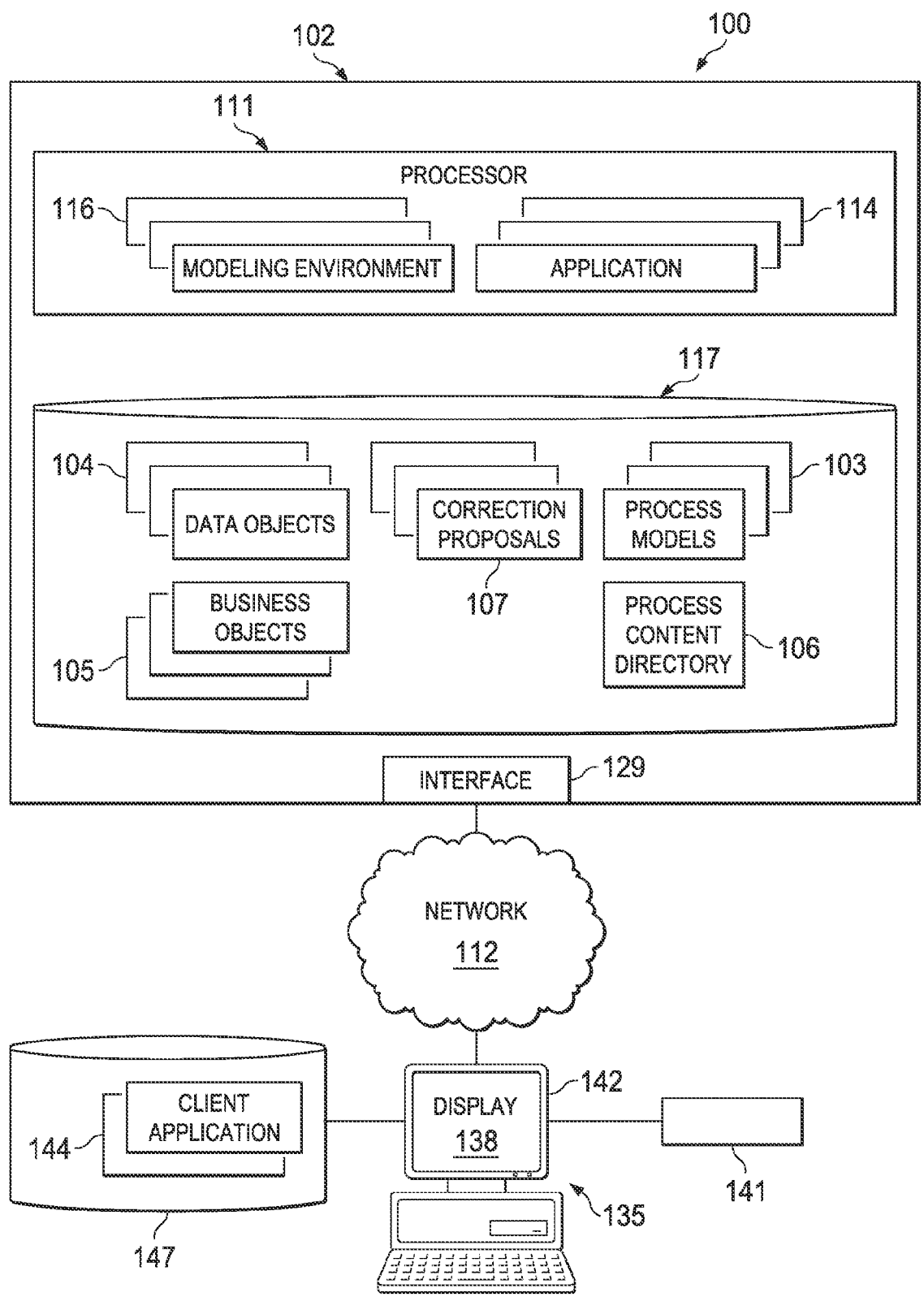
FIG. 1 is a schematic illustration of a system for providing a process model error correction framework.

Design flaws in process modeling may result in inconsistent application states, security violations, service level agreements (SLAs) and Key Performance Indicators (KPIs) not being reached, or a failure to terminate, among other things. These issues may generally be referred to as process errors or constraint violations. Also, process errors may affect various perspectives (e.g., control flow, data flow, conversations, message flows, resources/roles, etc.) and elements (e.g., gateways, activities, events, data flows, sequence flows, etc.) of a process model. These problems can be related to syntactical and semantic process model errors. Syntactical errors may include unconnected flow elements, missing configuration properties, etc. Because the syntactical errors stem from concrete, systemic issues, they may be identified by traversing the process model logically. Syntax can be formally defined (like by means of a meta model or a grammar) and there are technical means (like a parser or schema validation tools) to validate a model against a syntax specification. Semantic issues often require expert skills and are also difficult to relate to a root cause (i.e., a model fragment that needs to be altered in order to fix the problem). The likelihood of semantic model errors is amplified by graph-based modeling languages, such as BPMN, which favor free-form modeling over having many constraints (e.g., enforcing block-structuring the model where splits and mergers of process branches need to symmetrically pair up, thus, excluding certain semantic errors in the first place) with respect to how a process model needs to be structured. As a result, semantic model errors, such as "Deadlock," "Lack of Synchronization," "Cycle in Diverging Gateway," violated "Four-Eyes-Principle," and others, may occur. Semantic errors are inherently difficult to detect by a modeling person and difficult to fix without tampering with the process's semantics (i.e., the intent of the process).

In this context, this disclosure provides for automatically fixing the constraint violations without altering the intent of the process at hand and/or providing guidance that helps a modeling person to rectify the constraint violation. This disclosure describes automatically generating model change proposals based on generic correction patterns for the aforementioned error cases. The error correction techniques described herein apply to both traditional, single-user process model editors working on local copies of a process model and collaborative, multi-user model editors, where multiple people edit the same model sequentially or concurrently.

The techniques described herein provide for a model correction framework that, upon model changes, triggers a round-trip procedure that includes (1) an analysis stage where the altered portion of the model is checked by a flexible number of pluggable constraint check modules; (2) for each check that reports a constraint violation, a list of correction proposals is generated (before image/after image pairs of a model fragment); and (3) optionally automatically materializing the correction proposal, which is the after image of a model fragment (immediate fix); or (4) requesting confirmation by a modeling person to apply the correction proposal (interactive, user-chosen fix). The latter case is supported by a fingerprint-based concurrency control mechanism that warrants model consistency by discarding correction proposals that relate to a model fragment (before image) that has been concurrently altered in between. The fingerprint-based concurrency control mechanism is an example technique, and other techniques can be implemented. The bit string (fingerprint or checksum) serves as an efficient way to compare two snapshots of the same model—one snapshot created at the time when the correction proposal was prepared and sent to the user, and the second snapshot created when the user has confirmed the correction proposal to be applied. When the two snapshots are identical (i.e., the process model fragment has not changed in the meanwhile and their bit-string "fingerprints" are consequently identical), the (confirmed) correction proposal can be safely applied. In this way, both single-user editing and multi-user model editing are supported. A generic framework for model correction with pluggable model checks and correction proposal generators for traditional (non-collaborative) modeling environments and for collaborative modeling environments is described.

The correction framework identifies various constraint violation severities, including the "error" severity level, which is a severity level that indicates that the constraint violation will lead to runtime problems, and the "warning" severity level, which indicates that a particular constraint violation may be a deviation from best practices and may cause runtime problems. "Warning" severity level is applicable in situations where there is a lack of runtime knowledge (such as concrete instantiations of a business process and its accompanying data) because, without runtime knowledge, there is little or no ability to deduce whether or not the process (fragment) will turn out erroneous. A correction proposal will be established depending on the severity of the underlying constraint violation—that is, for "error" severities, a correction proposal may be established to address the constraint violation. Each constraint violation may result in a number of different correction proposals. The correction proposals may be complementary (thus, addressing different aspects of the underlying constraint violation) or mutually exclusive (by applying incompatible model fixes).

As described above, the correction framework provides for (1) selecting a correction proposal, or (2) offering a plurality of correction proposals to a modeling user to let the user choose the appropriate one (or multiple ones, if those are complementary). The correction framework also provides for ready-to-use correction proposals of frequently observed constraint violations, including "Deadlock," "Lack of Synchronization," "Cycle in Diverging Gateway," and violated "Four-Eyes-Principle." Those correction proposals preserve the intended semantics of the process fragment where the violation occurs.

FIG. 1 is a schematic illustration of a system 100 for providing a process model error correction framework. The illustrated environment 100 includes, or is communicably coupled with, server 102 and one or more clients 135, at least some of which communicate across network 112. In general, environment 100 depicts an example configuration of a system capable of identifying constraint violations in process models, providing correction proposals for resolving the constraint violations, and in some instances, automatically implementing a correction depending on the severity of the constraint violation. Certain aspects included in the server 102 may be implemented at the client 135, including the modeling environment 116, and the memory 147 can store data objects 104, correction proposals 107, process models 103, business objects 105, and other features stored in memory 117.

In general, the server 102 is any server that stores one or more hosted applications 114, where at least a portion of the hosted applications 114 are executed via requests and responses sent to users or clients 135 within and communicably coupled to the illustrated environment 100 of FIG. 1. In some instances, the server 102 may store a plurality of various hosted applications 114, while in other instances, the server 102 may be a dedicated server meant to store and execute only a single hosted application 114. In some instances, the server 102 may comprise a web server, where the hosted applications 114 represent one or more web-based applications accessed and executed via network 112 by the clients 135 of the system to perform the programmed tasks or operations of the hosted application 114. Hosted application 114 may be a hosted process modeling environment or may be a process execution environment in which processes modeled by client 135 are executed. At a high level, the server 102 comprises an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144. In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, illustrated server 102 may be adapted to execute any operating system, including Linux®, UNIX®, Windows®, Mac OS®, or any other suitable operating system. According to one embodiment, server 102 may also include or be communicably coupled with a mail server.

Generally, the network 112 facilitates wireless or wireline communications between the components of the environment 100 (i.e., between the server 102 and the clients 135), as well as with any other local or remote computer, such as additional clients, servers, or other devices communicably coupled to network 112 but not illustrated in FIG. 1. The network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance, at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations.

As shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 112 (e.g., client 135, as well as other systems communicably coupled to the network 112). Generally, the interface 129 comprises logic encoded in software and/or hardware in a suitable combination and operable to communicate with the network 112. More specifically, the interface 129 may comprise software supporting one or more communication protocols associated with communications such that the network 112 or interface's hardware is operable to communicate physical signals within and outside the illustrated environment 100.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the client(s) 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java®, Visual Basic, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to, and in connection with, one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java™ Beans (EJBs) or design-time components may have the ability to generate run-time implementations into different platforms, such as J2EE™ (Java™ 2 Platform, Enterprise Edition), ABAP (Advanced Business Application Programming) objects, or Microsoft's .NET®, among others. Additionally, the hosted applications 114 may represent web-based applications accessed and executed by remote clients 135 or client applications 144 via the network 112 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as at client 135. The design time environment (including the modeling environment 116) could be part of the client installation 135 and use a server to retrieve process models 103 and, possibly, the correlation proposals from some repository (like memory 117). For efficiency reasons, correlation proposals may be cached on the client side as well.

Application 114 may execute processes modeled by client 135. Similarly, application 114 may be a modeling environment through which client 135 models processes. For example, application 114 may access a memory 117 that stores process models 103, data objects 104, business objects 105, process content directory 106, and correction proposals 107.

Correction proposals 107 include correction proposals identified from historic design-time analyses of process models, as well as known error cases. Correction proposals 107 include corrections identified as likely solutions to common problems. For example, for "Deadlock" constraint violations, a particular correction proposal may be used often. By storing popular correction proposals, constraint violations may be resolved quickly and without having to calculate correction proposals for common problems at each instance, thereby reducing the use of system resources. The algorithms associated with specific correlation proposals do need to be applied on the specific process model (fragment); however, the logics to perform the correlation may be hard-coded in an efficient manner. In certain cases, there is some effort associated with identifying a problem and relating it to some specific process model artifact (like a specific gateway, for instance).

In general, the overall structure of the process model 103 ensures the consistency of the interfaces that are derived from the process model 103. The derivation helps ensure that the same business-related subject matter or concept can be represented and structured in the same way in various interfaces. The process model 103 defines the business-related concepts at a central location for a number of business transactions. In other words, it reflects the decisions made about modeling the business entities of the real world acting in business transactions across industries and business areas. The process model 103 is defined by the business objects 105 and their relationship to each other (the overall net structure).

Each business object 105 is thus a capsule with an internal hierarchical structure, behavior offered by its operations, and integrity constraints. Business objects 105 are generally semantically disjointed, i.e., the same business information is represented once. In some embodiments, the business objects 105 are arranged in an ordering framework such that they can be arranged according to their existence dependency to each other. For example, in a modeling environment, the customizing elements might be arranged on the left side of the process model 103, the strategic elements might be arranged in the center of the process model 103, and the operative elements might be arranged on the right side of the process model 103. Similarly, the business objects 105 can be arranged in this model from the top to the bottom based on defined order of the business areas, e.g., finance could be arranged at the top of the business object model with customer relationship management (CRM) below finance, and supplier relationship management (SRM) below CRM. To help ensure the consistency of interfaces, the business object model may be built using standardized data types, as well as packages, to group related elements together, and package templates and entity templates to specify the arrangement of packages and entities within the structure.

A business object may be defined such that it contains multiple layers, such as in the example business object 105. The example business object 105 contains four layers: the kernel layer, the integrity layer, the interface layer, and the access layer. The innermost layer of the example business object is the kernel layer. The kernel layer represents the business object's inherent data, containing various attributes of the defined business object. The second layer represents the integrity layer. In the example business object 105, the integrity layer contains the business logic of the object. Such logic may include business rules for consistent embedding in the environment 100 and the constraints regarding the values and domains that apply to the business object 105. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 105. The third layer, the interface layer, may supply the valid options for accessing the business object 105 and describe the implementation, structure, and interface of the business object to the outside world. To do so, the interface layer may contain methods, input event controls, and output events. The fourth and outermost layer of the business object 105 is in the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java™, among others. Additionally, business objects 105 of this embodiment may implement object-oriented technologies such as encapsulation, inheritance, and/or polymorphism.

Some or all of the data objects 105, models 103, and information associated with or stored in the process content directory 106 may be stored or referenced in a local or remote memory 117, which can be a development or metamodel repository. This memory 117 may include parameters, pointers, variables, algorithms, instructions, rules, files, links, or other data for easily providing information associated with or to facilitate modeling of the particular object. More specifically, each memory 117 may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains. In short, each repository may comprise one table or file or a plurality of tables or files stored on one computer or across a plurality of computers in any appropriate format as described above. Indeed, some or all of the particular repository may be local or remote without departing from the scope of this disclosure and store any type of appropriate data.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. Additionally, memory 117 may include any other appropriate data, such as VPN applications, firmware logs and policies, firewall policies, a security or access log, print or other reporting files, as well as others.

Memory 117, whether local or distributed, can also store a process content directory 106. The process content directory 106 can store detailed relationship and connection information defined between the models and entities designed in the modeling environment 116, as well as provide the data and other information needed to allow for the automated addition of model-related and model-defining information into high-level models created by business users and technical developers. For example, the directory 106 may store detailed information regarding additional and/or more detailed connections defined for the high-level elements created or modeled in the modeling environment 116. The process content directory 106 can store information used to define previously-generated models, including the connections and operations included in and associated with various modeled entities. Therefore, the information stored in the directory 106 can be used for the automatic generation of later-developed or updated models when one or more elements added to a particular model have previously been used or modeled in earlier-defined models. Additionally, changes to one or more of the models associated with the directory 106 can be reflected in the data stored therein. Process models 103 defined or generated using information from the directory 106 can be automatically updated by reloading or re-analyzing the modified information stored within the directories.

In some instances, the process content directory 106 can store information defining which entities are available for a particular process, business area, or work center, among others. For instance, where a particular component has already been defined in the modeling environment 116, information stored in the process content directory 106 can be used to describe a set of entities to which that particular component can navigate to or be associated with. Using information retrieved from the process content directory 106, a model describing the navigation available from a particular component can be at least partially generated or described.

The illustrated environment of FIG. 1 also includes one or more clients 135. Each client 135 may be any computing device operable to connect to or communicate with at least the server 102 and/or via the network 112 using a wireline or wireless connection. Further, as illustrated by client 135, each client 135 includes a processor 141, an interface 142, a graphical user interface (GUI) 138, a client application 144, and a memory 147. In general, each client 135 comprises an electronic computer device operable to receive, transmit, process, and store any appropriate data associated with the environment 100 of FIG. 1. It will be understood that there may be any number of clients 135 associated with, or external to, environment 100, even though environment 100 shows a single client. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD- ROM, or other suitable media to both receive input from and provide output to users of the clients 135 through the display, namely, the GUI 138. The process model error correction techniques described herein may be implemented solely on a client device that that hosts the modeling environment, the process model(s), and the correction proposals/templates. Data objects 104, business objects 105, process content directory 106, and hosted application 114 are optional.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

FIG. 2A is a schematic of an example process model 200 showing a "Deadlock" constraint violation. The example process model 200 includes four "activities" and two "gateways." In some implementations, Business Process Modeling Notation (BPMN) facilitates the concurrent execution of process steps by splitting the control flow into parallel branches. BPMN is a standard for business process modeling, and provides a graphical standard notation for specifying business processes in a Business Process Diagram (BPD). In general, the objective of BPMN is to support business process management for both technical users and business users by providing a notation that is intuitive to business users, yet capable of representing complex process semantics. Further, the BPMN specification can provide a mapping between the graphics of the notation to the underlying constructs of execution languages. Because BPMN is understandable by both technical and business users, networked business processes can be described using BPMN, providing a common point of understanding for users from different entities. The BPMN standard provides for "Inclusive Gateways" (also referred to as "OR" split/join), "Parallel Gateways" (also referred to as "AND" split/join), and "Complex Gateways," and others, each of which facilitate the forking (or branching) and/or synchronization of concurrent threads of control executing process steps on separate branches.

Process model 200 shown in FIG. 2A includes an Inclusive Gateway 202, which is an XOR split, and a Parallel Gateway 204, which is an AND join. Activity 0 206 is the first activity, which resides in a sequential branch of the process model. An XOR split 202 established the start of a split branch of the process model that includes Activity 1 208 and Activity 2 210. The parallel branches are joined at the AND join 204. Activity 3 212 occurs after the parallel branches.

Process model 200 illustrates an example constraint violation—a "Deadlock." Here, the "Deadlock" occurs at AND join gateway 204. The process flow indefinitely blocks at runtime (i.e., the process never terminates or reaches next stage) because the AND join gateway expects both of its incoming branches to be triggered in order to execute the join. This type of constraint violation is difficult to identify and resolve at runtime for end users. The severity of this constraint violation can be considered as an "error" because the process either never terminates or does not reach the next stage, due to the strict join condition of the AND join not being reached.

FIG. 2B is a schematic representation illustrating a first variant (Variant 1) of a correction proposal for the "Deadlock" shown in FIG. 2A. Process model 220 shows a logical construction of a parallel branch that begins with an XOR split 222 and terminates with an AND join 224—similar to the parallel branch of process model 200 shown in FIG. 2A. The first proposed correction (Variant 1) includes replacing the AND join 224 with an Inclusive gateway (OR join) 228 in the new process model 221 (the XOR split 226 remains). By replacing the AND join 224 with the OR join 228, the process model constraint violation ("Deadlock") can be corrected without tampering with the execution semantics. The OR join synchronizes flexible token combinations, as opposed to the AND join, which involves single, fixed token combinations. The OR join will essentially synchronize the upstream, incoming flow that exists (in flexible, dynamically determined combinations).

Figure 2C:
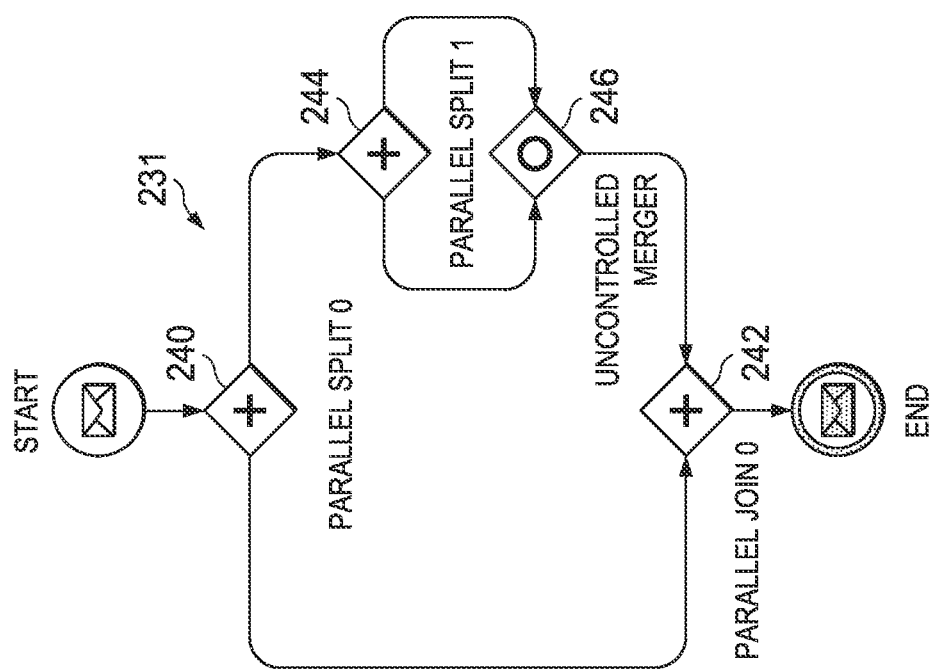
FIG. 2C is a schematic representation illustrating a second variant (Variant 2) of a correction proposal for a "Deadlock" process error.
Figure 2C:
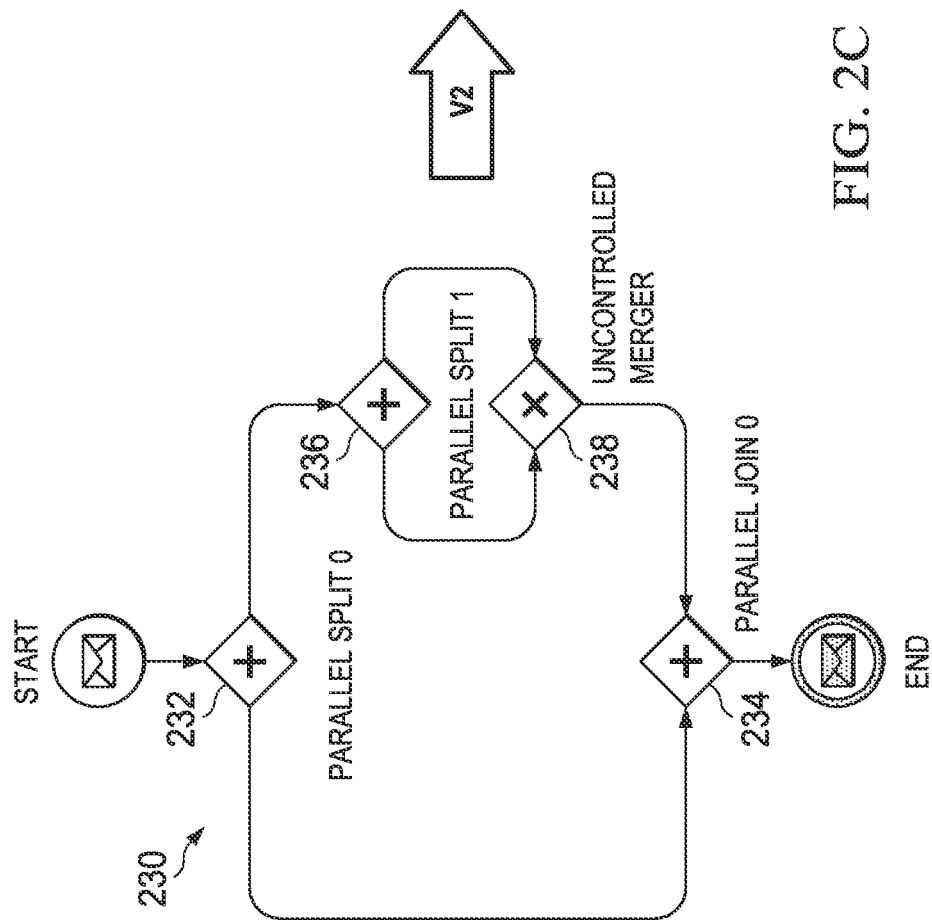

FIG. 2C is a schematic representation illustrating a second variant (Variant 2) of a correction proposal for a "Deadlock" process error caused by a "Lack of Synchronization." In FIG. 2C, the original process model 230 includes a parallel branch beginning with an AND split 232 and joining at an AND join 234. A second parallel branch resides on one of the branches between the AND split 232 and AND join 234. This second parallel branch is established by an AND split 236 and is joined by an XOR join 238. In process model 230, a "Deadlock" may occur at the AND join 234 that has an AND split 236 counterpart upstream. "Deadlock" here may be caused by (1) "Lack of Synchronization" or (2) "Cycle in Diverging Gateway" situation in the second parallel branch (in the case of process model 230, the constraint violation is a "Lack of Synchronization" in the second parallel branch). The constraint violation may be corrected by applying the correction proposals associated therewith—in this case, for "Lack of Synchronization." Specifically, process model 231 includes an AND split 240 and an AND join 242 with an unbalanced parallel split 244 upstream of the parallel join 242. The XOR join 238 of process model 230 is replaced by an OR join 246. Variant 2 can be combined with Variant 1 as appropriate.

Figure 3A:
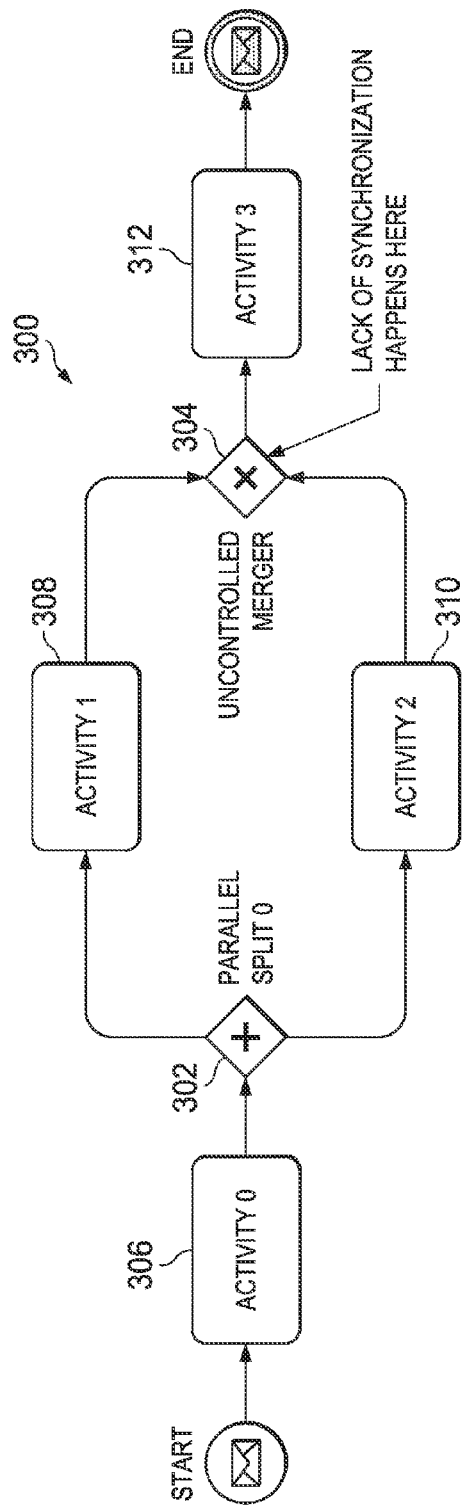
FIG. 3A is a schematic of an example process model showing a "Lack of Synchronization" constraint violation.

FIG. 3A is a schematic of an example process model 300 showing a "Lack of Synchronization" constraint violation. Process model 300 shown in FIG. 3A includes a Parallel Gateway 302, which is an AND split, and an uncontrolled merge 304, which is an XOR join. Activity 0 306 is the first activity, which resides in a sequential branch of the process model. An AND split 302 established the start of a parallel branch of the process model that includes Activity 1 308 and Activity 2 310. The parallel branches are joined at the XOR join 304. Activity 3 312 occurs after the parallel branches.

Process model 300 illustrates a "Lack of Synchronization" constraint violation, which occurs in this example at the XOR join 304. In this example, the severity of the constraint violation is a "warning." The process unintentionally executes certain model elements multiple times, though a single execution was intended (here, "Activity 3" is executed twice). The process actions and side effects are duplicated, possibly resulting in inconsistent states. Process termination may be inhibited due to "dangling tokens." Specifically, a process may not be designed to handle multiple incoming tokens at end events and, thus, defer or prevent a successful process termination.

Figure 3B:
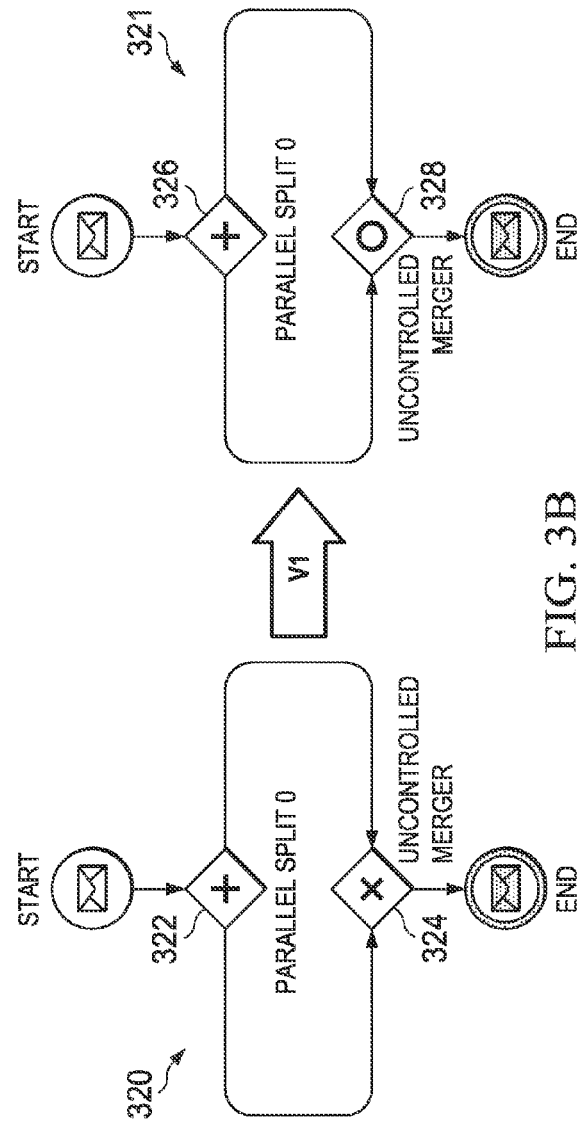
FIG. 3B is a schematic representation illustrating a first variant (Variant 1) of a correction proposal for the "Lack of Synchronization" constraint violation shown in FIG. 3A.

FIG. 3B is a schematic representation illustrating a first variant (Variant 1) of a correction proposal for the "Lack of Synchronization" constraint violation shown in FIG. 3A. Process model 320 shows a logical construction of a parallel branch that begins with an AND split 322 and terminates with an uncontrolled merge 324—similar to the parallel branch of process model 300 shown in FIG. 3A. The first proposed correction (Variant 1) includes replacing the uncontrolled merge 324 with an OR join 328 in the new process model 321. By replacing the XOR join 324 with the OR join 328, the process model constraint violation ("Lack of Synchronization") can be corrected (the AND split 326 remains). The correction, however, depends on the flow analysis. If upstream flow does not contain a "Cycle in Diverging Gateway" or "Lack of Synchronization" constraint violation, the XOR join 324 may be replaced with an OR join 328. The OR join 328 synchronizes the tokens from multiple inbound edges into a single outbound token.

Figure 3C:
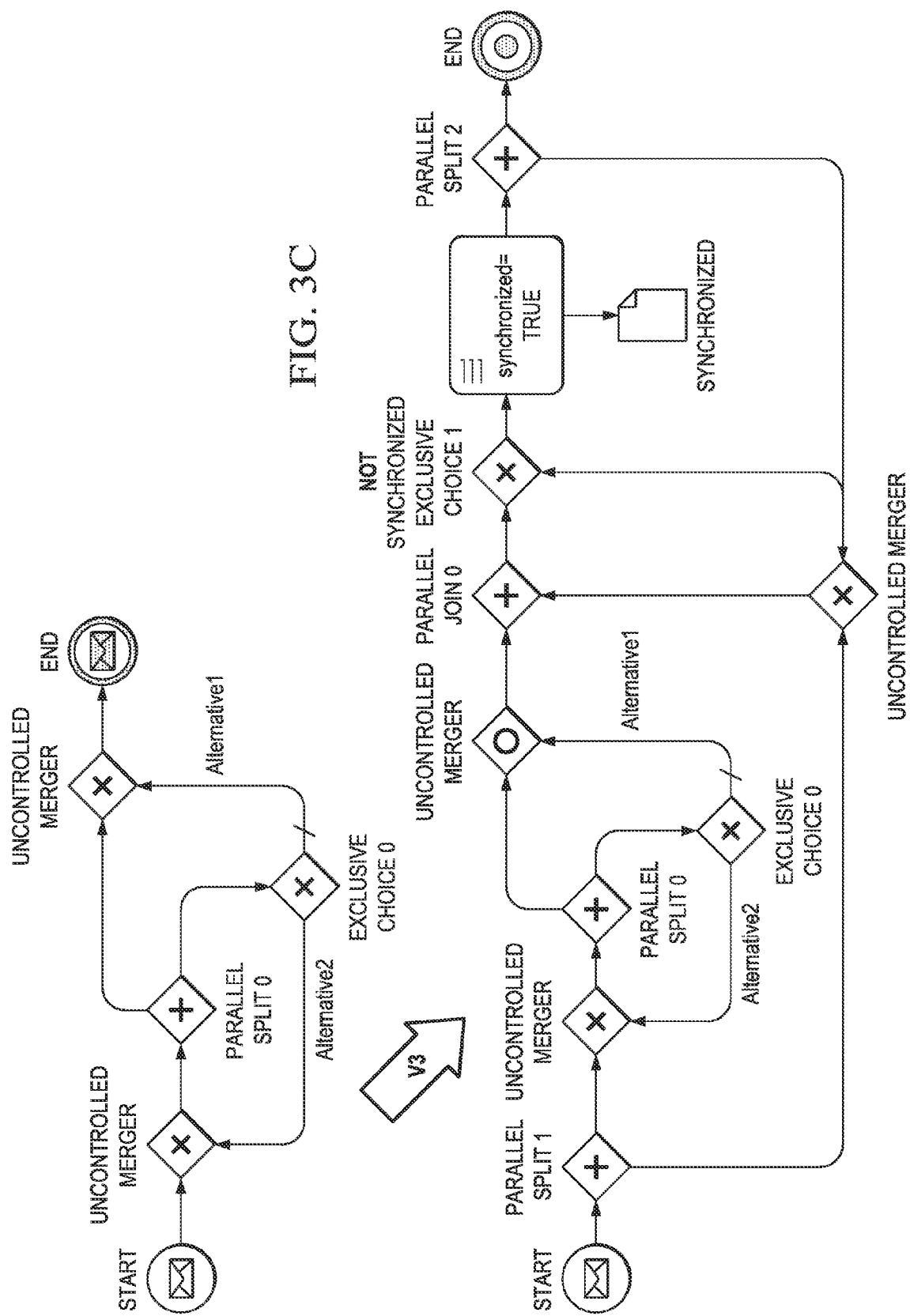
FIG. 3C is a schematic representation illustrating a second variant (Variant 2) of a correction proposal for the "Lack of Synchronization" constraint violation.

If the upstream process contains a "Lack of Synchronization" or "Cycle in Diverging Gateway" situation, an OR join will still produce multiple outbound tokens if any inbound edge carries multiple tokens. A so-called thread merge pattern can be used to synchronize those tokens (Variant 2). FIG. 3C is a schematic representation illustrating a second variant (Variant 2) of a correction proposal for the "Lack of Synchronization" constraint violation. In FIG. 3C, it is assumed that the upstream process contains a "Lack of Synchronization" or "Cycle in Diverging Gateway" situation.

A "Thread Merge" pattern is a process model fragment that synchronizes multiple tokens from a single branch into a single token. In this way, it may counter-act a "Lack of Synchronization" situation, which produces multiple tokens on a single branch. BPMN does not natively (i.e., using a dedicated model element) support "Thread Merge." However, the same effect as "Thread Merge" can be accomplished (and is applied in FIG. 3C) using a combination of existing BPMN artifacts.

"Discriminator" is another workflow pattern that provides for just another way of synchronizing flow (aka "tokens") from multiple branches. Similar to "OR joins" ("Inclusive Gateways"), a discriminator synchronizes "unbalanced" flows (e.g., a discriminator with 3 ingoing branches synchronizes any combination of 1, 2, or 3 tokens from its ingoing branches [no more than one token from either branch, though]). Different from an OR join, though, it passes on a single token to its outgoing branch as soon as it has seen (at least) one token from any of its ingoing branches.

FIG. 3C rectifies the "Lack of Synchronization" situation at the upper right XOR-merge gateway which is caused by two issues being (i) a cycle in a diverging gateway (here: "Exclusive Choice 0") and an unbalanced AND-split ("Parallel Split 0") and XOR-merge ("Uncontrolled Merge . . . ") combination. The idea to fix these issues is, thus, twofold: For one, the XOR merge gateway, which causes a Lack of Synchronization in the first place, is replaced by an OR merge. In effect, a Lack of Synchronization is resolved iff "Exclusive Choice 0" directs the flow to its right outbound branch (i.e., does NOT cycle back the flow to upstream). For the latter case, the entire downstream process fragment implements a flavor of the "Discriminator" pattern mixed with a "Thread Merge" pattern, which basically forwards the first token to exit from the newly introduced OR merge to further downstream (here: ending up at the end event, other configurations are conceivable) AND synchronizing all other tokens being emitted from the OR merge using a "Thread Merge" pattern.

Figure 4A:
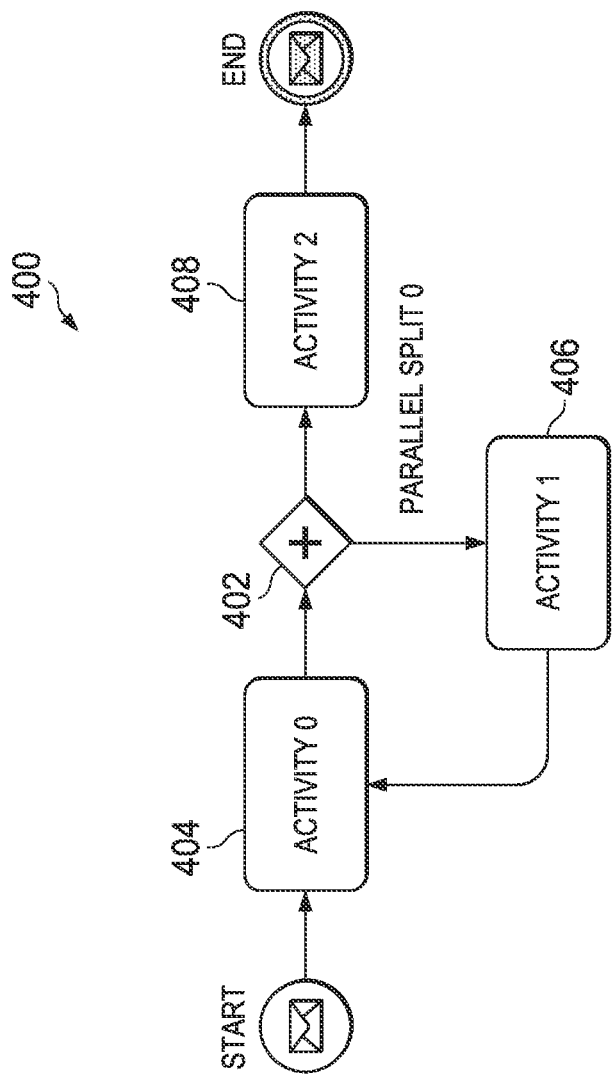
FIG. 4A is a schematic representation of an example process model illustrating a "Cycle in Diverging Gateway" constraint violation.

FIG. 4A is a schematic representation of an example process model 400 illustrating a "Cycle in Diverging Gateway" constraint violation. Process model 400 includes Activity 0 404 that precedes an AND split 402. The AND split 402 diverges two edges—one proceeding to Activity 1 406 and another proceeding to Activity 2 408. Activity 2 408 proceeds to the end of the process. Activity 1 406, however, establishes a loop or cycle with Activity 0 404 and the AND split 402. This loop is non-terminating. The process non-deterministically spawns new flow (AND split, but can occur for OR split;

for XOR and OR splits, it redirects flow away from a process fragment—specifically, it redirects flow away back upstream). Thus, a "Cycle in Diverging Gateway" constraint violation occurs at the AND split 402 (in this example, the gateway is an AND split, but "Cycle in Diverging Gateway" constraint violations can occur in OR and XOR splits, as well). The severity of this constraint violation is "warning" because part of the process may terminate after Activity 2, but additional, unnecessary process executions may occur in the loop. The loop possibly results in "lifelocks," which are endless loops causing resource depletion and non-termination issues, and may also result in process fragments ("Deadlock"s, "Lack of Synchronization") or other erroneous scenarios. Other situations exists wherein processes fail to terminate but are busy continuously executing process steps in certain process fragments. In contrast, Deadlocks prevent a process from completing but do not actively execute process steps while doing so. In a sense, a lifelock may be more harmful than a Deadlock due to the fact that a lifelock consumes system resources (notably, CPU cycles).

Figure 4B:
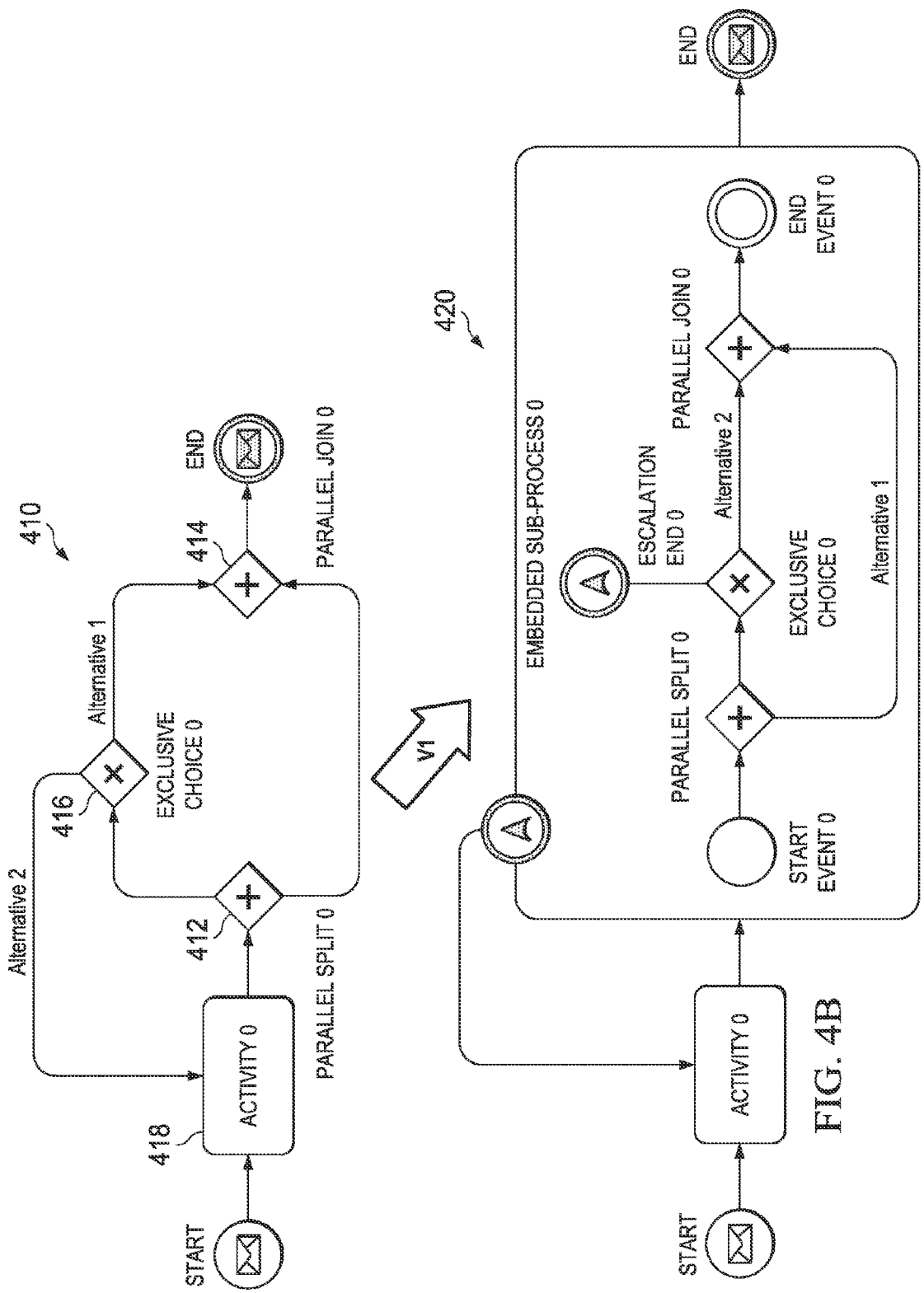
FIG. 4B is a schematic representation of an example correction proposal (Variant 1) for the "Cycle in Diverging Gateway" constraint violation.

FIG. 4B is a schematic representation of an example correction proposal (Variant 1) for the "Cycle in Diverging Gateway" constraint violation. In FIG. 4B, a process model 410 is shown, which includes a "Cycle in Diverging Gateway," similar to that shown in process model 200 of FIG. 4A. In process model 410, an AND split 412 establishes the start of a parallel branch, which eventually joins at an AND join 414. An XOR split 416 establishes a loop back to Activity 0 418. In this case, entrance into the loop is state-dependent (i.e., it depends on how the XOR split ("Exclusive Choice 0") evaluates its conditions), but because it follows immediately after an AND split 412, the loop may be entered at each instance, creating a "Cycle in Diverging Gateway." But, as mentioned above, whether or not the process really enters the cycle can be determined at runtime. However, when the process enters the cycle, it would subsequently Deadlock at "Parallel Join 0." In that sense, the cycle is redundant or erroneous and should, thus, be removed or replaced with a "safe" (Deadlock-free) variant. Further, a "Deadlock" occurs at the AND join 414 if the XOR split would proceed into the loop.

Process model 420 is an example correction proposal for the constraint violation shown in process model 410. "Lack of Synchronization" or "Deadlock" situations can be avoided by aborting the entire "scope" of the gateway (including tokens on other branches). The innermost block (also known as "scope") of the gateway can be determined, and an embedded subflow can be introduced at the block boundary. The backlink edge can be broken up into a "Raise Signal End Event" inside the block and "Catch Signal Boundary Event" at the block boundary.

The technique represented in FIG. 4B is to wrap the block with the diverging gateway into a sub-process, and make use of the implicit block termination semantics of "Boundary Events" (a BPMN artifact). That is, whenever the XOR split directs the flow to the "Escalation End" event, an "Escalation Event" was created and sent to the outer process where it is caught by the "Boundary Event" (the circular shape on the top left of the sub-process bounding box). In effect, the inner scope was entirely cancelled, including the tokens/flow from parallel branches. Essentially, the Deadlock at "Parallel Join 0" was resolved (the token is removed from its lower ingoing edge).

Figure 4C:
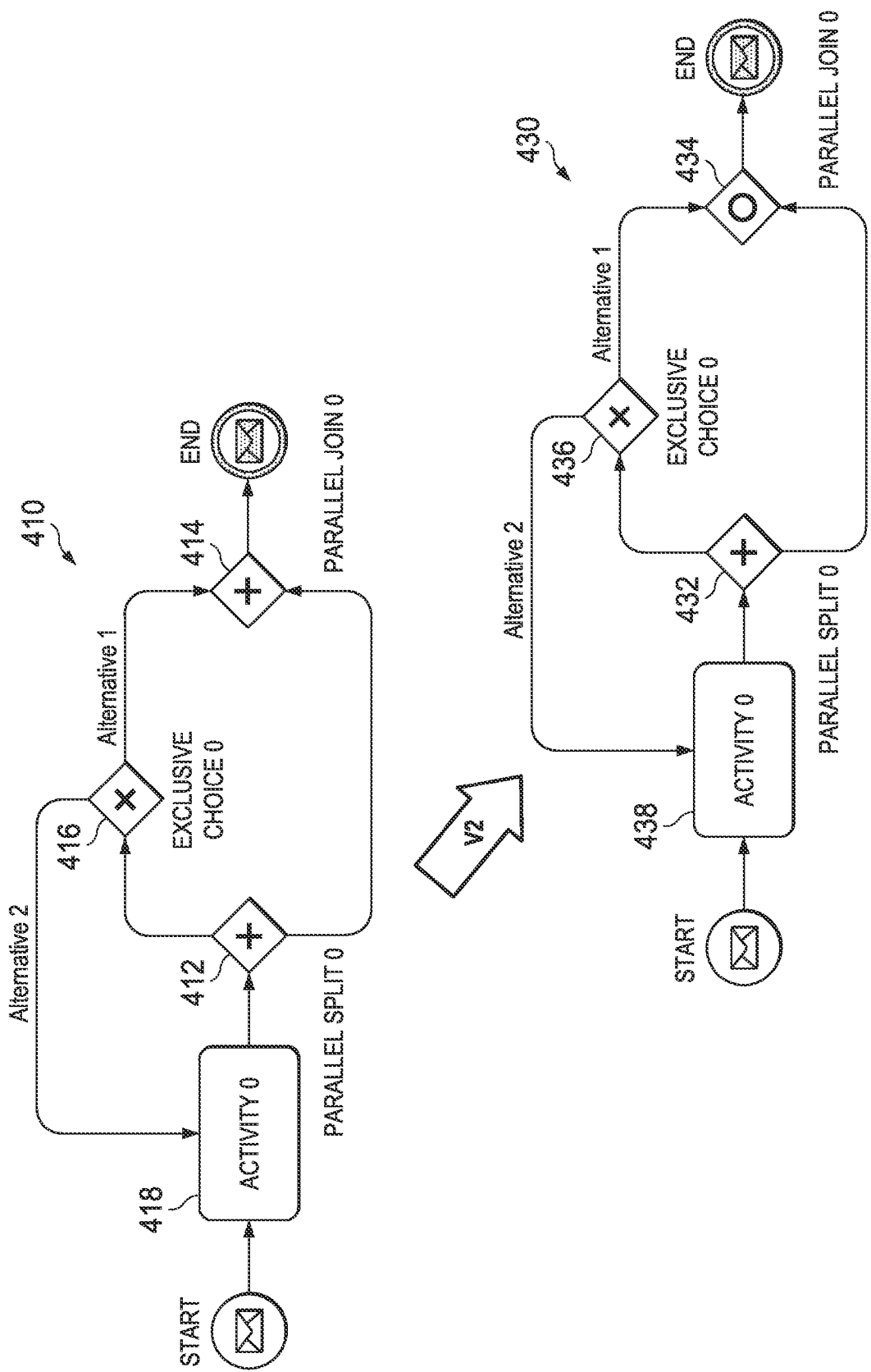
FIG. 4C is a schematic representation of an example correction proposal (Variant 2) for the "Cycle in Diverging Gateway" constraint violation.

FIG. 4C is a schematic representation of an example correction proposal (Variant 2) for the "Cycle in Diverging Gateway" constraint violation. FIG. 4C illustrates process model 410, which is the same process model 410 from FIG. 4B. In process model 410, an AND split 412 establishes the start of a parallel branch, which, eventually, joins at an AND join 414. An XOR split 416 (436 in process model 430) establishes a loop back to Activity 0 418 (438 in process model 430). In this case, entrance into the loop is state-dependent, but because it follows immediately after an AND split 412, the loop will be entered at each instance, creating a "Cycle in Diverging Gateway." Further, a "Deadlock" occurs at the AND join 414 because the XOR split would only proceed into the loop.

Variant 2 of the correction proposal involves correcting the problem where it occurs. In this case, a "Deadlock" occurs at the AND join 414. The correction proposal (Variant 2) includes replacing the AND join 414 with an OR join 434. Process model 430 shows how the inclusive gateway 434 can be implemented. AND split 432 establishes a parallel branch. The branch can terminate after the OR join 434 based on the lower token. The upper token can enter the loop, which may be a "Cycle in Diverging Gateway," but such a cycle can exist in this process model 430 without the creation of an "error" severity (though, while resolving the Deadlock, a "Lack of Synchronization" situation can be generated implicitly downstream of the OR join, which is less severe than a Deadlock and may in rare cases even be desired). It is understood that Variant 1 and Variant 2 correction proposals for "Cycle in Diverging Gateway" are mutually exclusive.

Figure 4D:
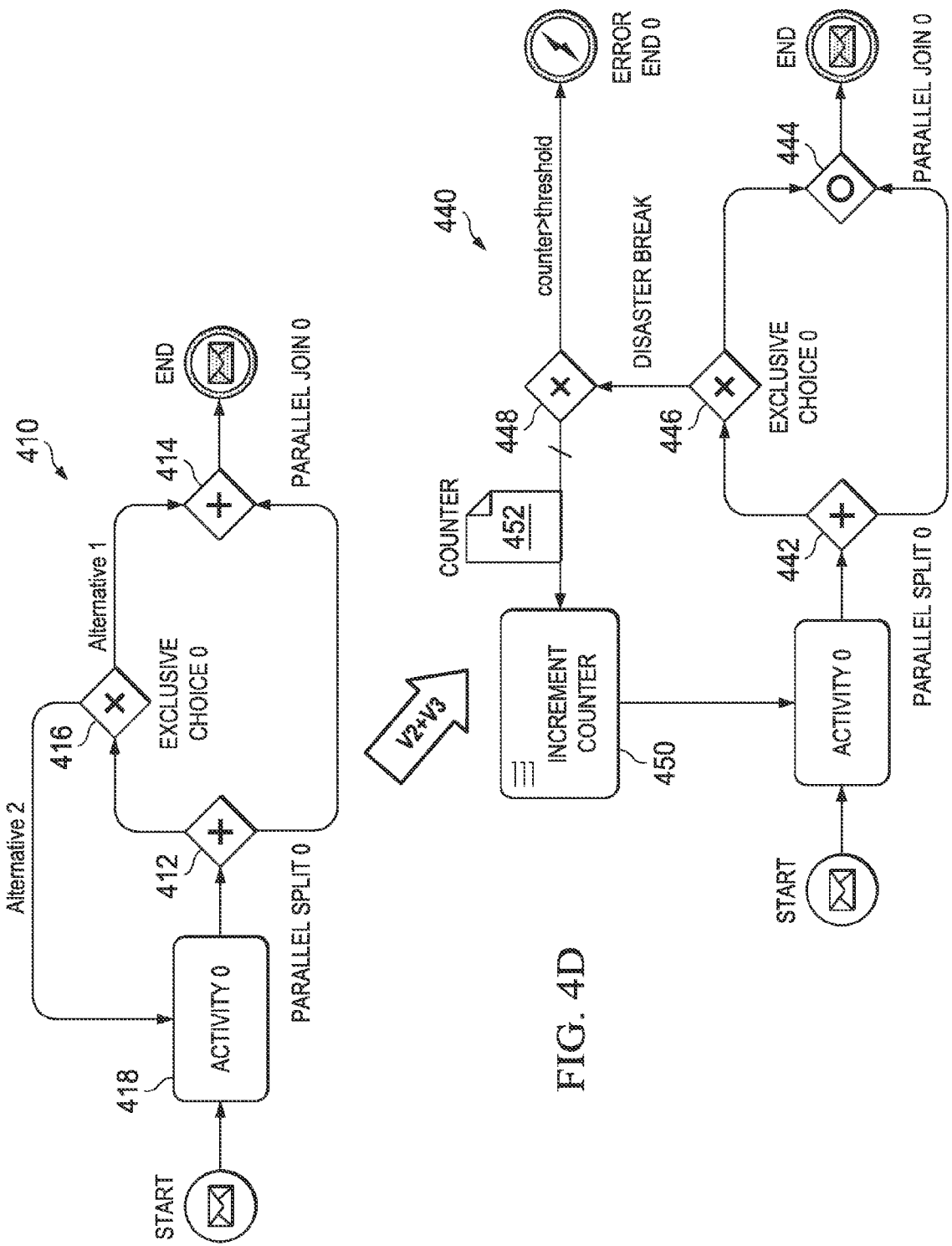
FIG. 4D is a schematic representation of an example correction proposal (Variants 1 and 3) for the "Cycle in Diverging Gateway" constraint violation.

FIG. 4D is a schematic representation of an example correction proposal (Variants 2 and 3) for the "Cycle in Diverging Gateway" constraint violation. FIG. 4D illustrates process model 410, which is the same process model 410 from FIG. 4B. In process model 410, an AND split 412 establishes the start of a parallel branch, which, eventually, joins at an AND join 414. An XOR split 416 establishes a loop back to Activity 0 418. In this case, entrance into the loop is state dependent, but because it follows immediately after an AND split 412, the loop may be entered at each instance, creating a "Cycle in Diverging Gateway." (Though, as mentioned above, whether the loop is entered, creating the "Cycle in Diverging Gateway," is determined at runtime.) Further, a "Deadlock" occurs at the AND join 414 because the XOR split would only proceed into the loop.

Variant 3 includes fixing the lifelock (also known as "endless loop") by introducing a "disaster break" concept. A loop counter can abort the loop and signal a process error when a threshold count is exceeded (e.g., the count may represent how often a token has entered the cycle). In the most conservative settings, that threshold may be defined as "0" such that the very first (attempted) entry into the loop causes the process to abort with signaling an error. Process model 440 is a process model that includes an AND split 442 that establishes a parallel branch. A disaster break 448 is placed at the output of the XOR split 446. An increment counter 450 can count the loop cycles and store them in a counter 452. If the count exceeds a threshold value, the error is signaled and the loop terminated.

Variant 3 can be combined with variant 1 or variant 2. For example, the AND join 414 of process model 410 is replaced in process model 440 with an OR join 444 that remedies a "Deadlock" situation from the "Lifelock."

Figure 5A:
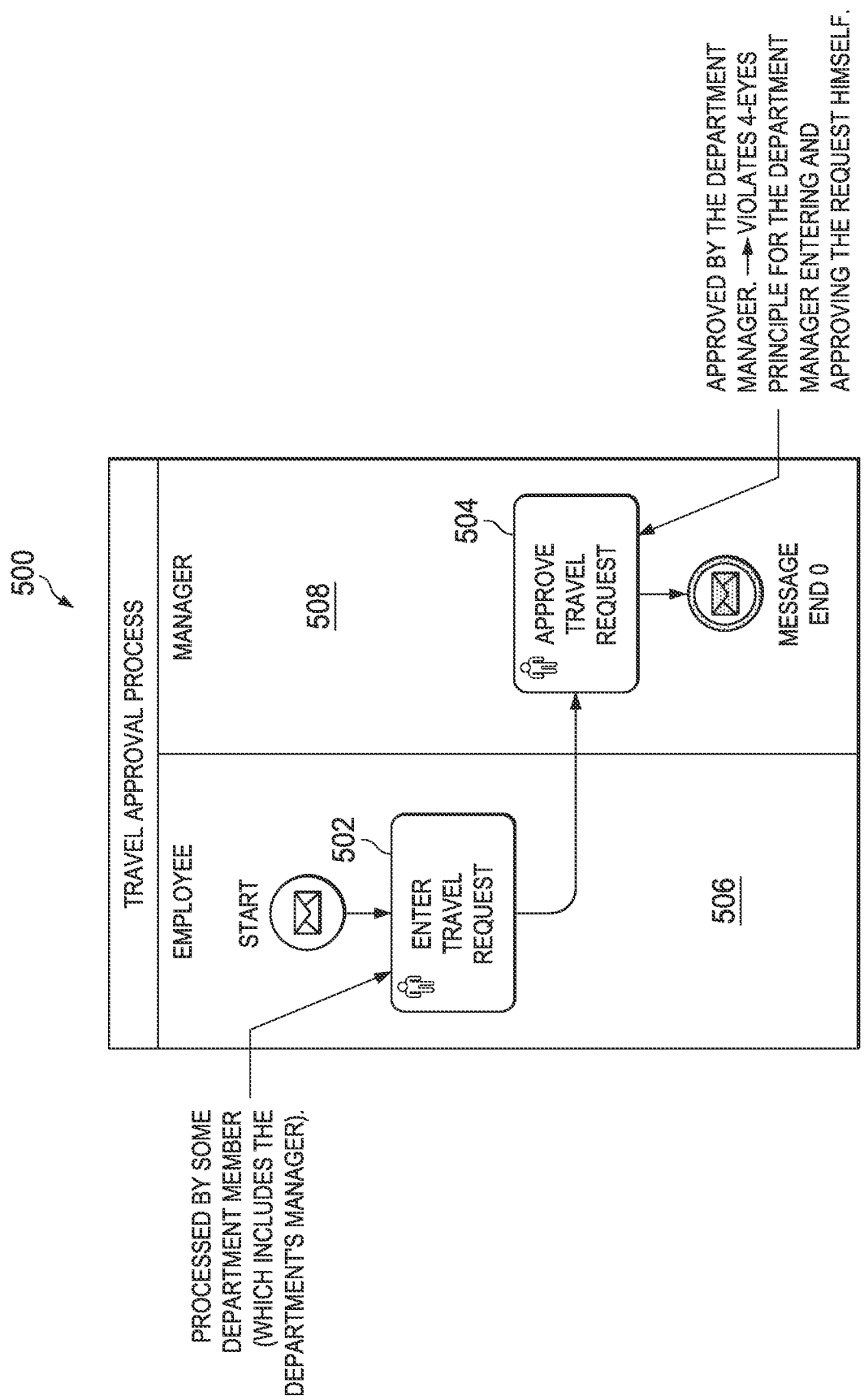
FIG. 5A is a schematic representation of a process model exhibiting a "Four-Eyes-Principle" constraint violation.

FIG. 5A is a schematic representation of a process model 500 exhibiting a Four-Eyes-Principle constraint violation. The process model 500 includes a two-step approval process. In this example, the process is a Travel Approval Process 500. The first task is "Enter Travel Request" 502. The task may be processed by some department member (employee 506), which includes the department's manager. The next task is "Approve Travel Request" 504. The travel request is approved by the department manager 508. If the manager is also the person that enters the travel request, then the same person is approving both tasks. The process model 500 intends for two approvers (i.e., four eyes) to review and approve the request. In this case, however, a single approver may perform both approval tasks (i.e., manager 508). In other words, employee 506 is the same person as manager 508, which is a violation of the "Four-Eyes-Principle." The severity of this violation is a warning. The issue includes a violation of company policies or legal policies. In general, there may be no way to know whether the task processor resolution rules configured in conjunction with tasks "Enter Travel Request" and "Approve Travel Request" are mutually exclusive. That is due to the fact that those rules may depend on process instance data (like the department name) which are not known at design time.

Figure 5B:
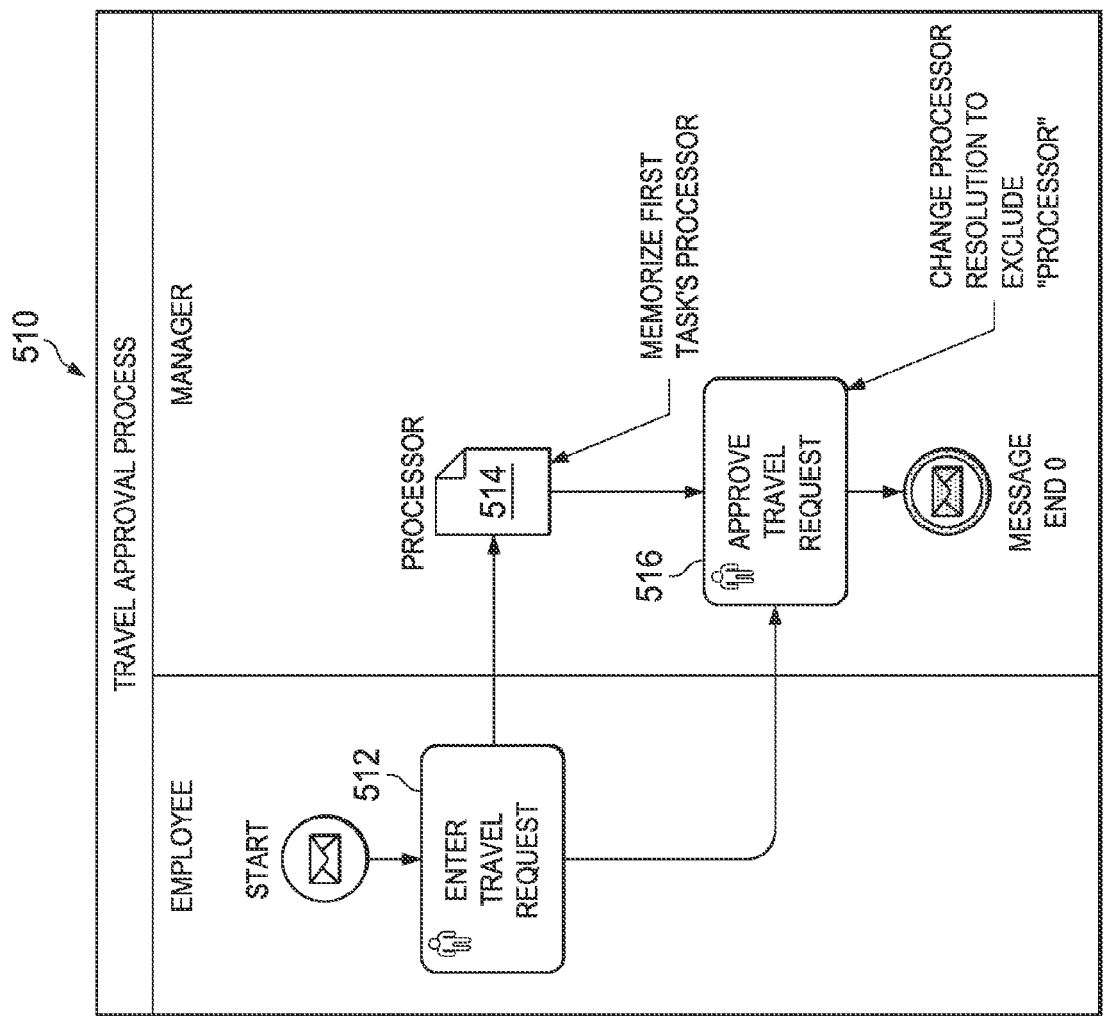
FIG. 5B is a schematic representation of a correction proposal to the "Four-Eyes-Principle" constraint violation shown in FIG. 5A.

FIG. 5B is a schematic representation of a correction proposal to the "Four-Eyes-Principle" constraint violation shown in FIG. 5A. The correction proposal includes making the task role aware of the resolution context. All tasks for which the Four-Eyes-Principle applies can be serialized into a strict order. The processor (also known as "actual owner") of predecessor task(s) is excluded from list of potential owners of the current task. This can be done by storing the predecessor task owners, and comparing the current task owner with the predecessor task owner. That single task owner is (after the task is completed) stored in the process context ("processor" data object) and referred to in the processor resolution rule of the "Approve Travel Request" 504 task. Normally, processor resolution rules evaluate eligible people to process that task. For instance, the resolution rule of "Enter Travel Request" 502 may refer to all members of a department. The second "Approve Travel Request" 504 resolution rule may refer to all department members granted permission to make orders on behalf of the cost center. The latter group may be department members who file their own travel requests. Due to the four-eyes-policy, the process needs to ensure that the second task is processed by a cost center owner different from the person entering the travel request.

Process model 510 includes a task "Enter Travel Request" 512, which is performed by a first person. The first person ID is stored in a data object "processor" 514. The process model 510 also includes a task "Approve Travel Request" 516, which is performed by a second person. At runtime, the second person ID is compared against the first person ID stored in "processor" data object 514. The first person is excluded from processing the task Approve Travel Request 516. In terms of a model change to enforce the semantics, the task owner resolution rule of the second task can be amended as follows: potential_owners:=<department members eligible to file orders on cost center>MINUS<processor of first task>.

Figure 6A:
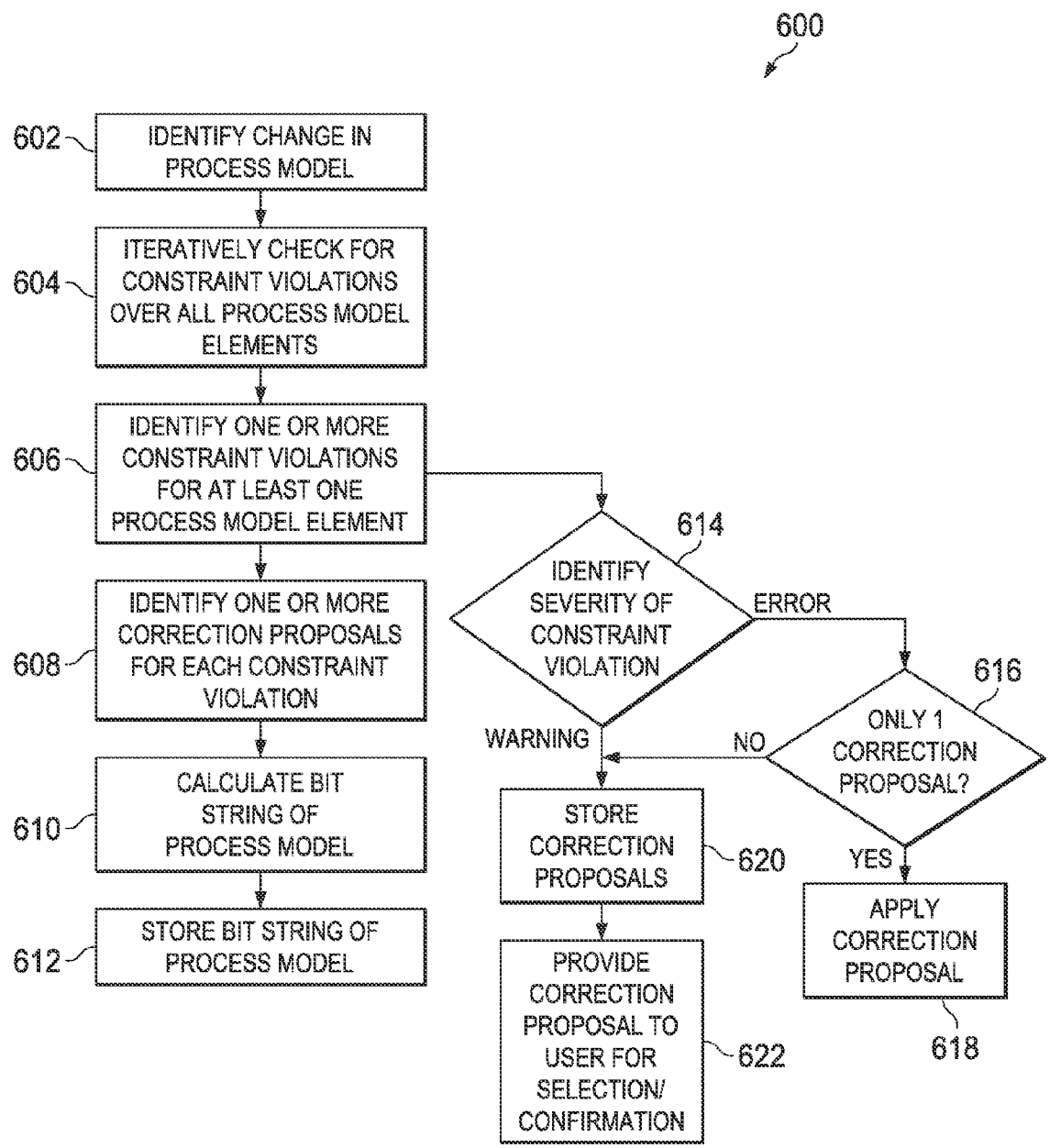
FIG. 6A is a process flow chart for identifying correction proposals.

FIG. 6A is a process flow chart 600 for identifying correction proposals. The process may be computer-implemented. A change in the process model can be identified (602). As indicated before, incrementally watching for model changes is one option for the invention to be triggered. Alternatively, the modeling person may also have a process model checked on explicit request. The process model includes one or more process model elements, such as an activity, a gateway, etc. The process model can be traversed. A list of constraint checks can also be traversed iteratively over all process model elements (604). One or more constraint violations for at least one of the one or more process model elements can be identified (606). If the check results in the detection of a constraint violation, matching correction proposals can be rendered (608) (i.e., identified and prepared). A fingerprint, checksum, or other bit string of the model portion that is to be altered can be computed (610) and stored (612).

The severity of the constraint violations can be identified (614). A determination can be made as to whether the severity is "error" or "warning." If the severity is "error," a determination can be made as to whether there is only one correction proposal (616). If the severity is "error" and there is only one correction proposal, the correction proposal can be applied without further input (i.e., the process model can be altered to rectify the problem) (618). Otherwise, the correction proposals can be stored (620) and sent to the modeler user(s) for selection and confirmation (622).

Figure 6B:
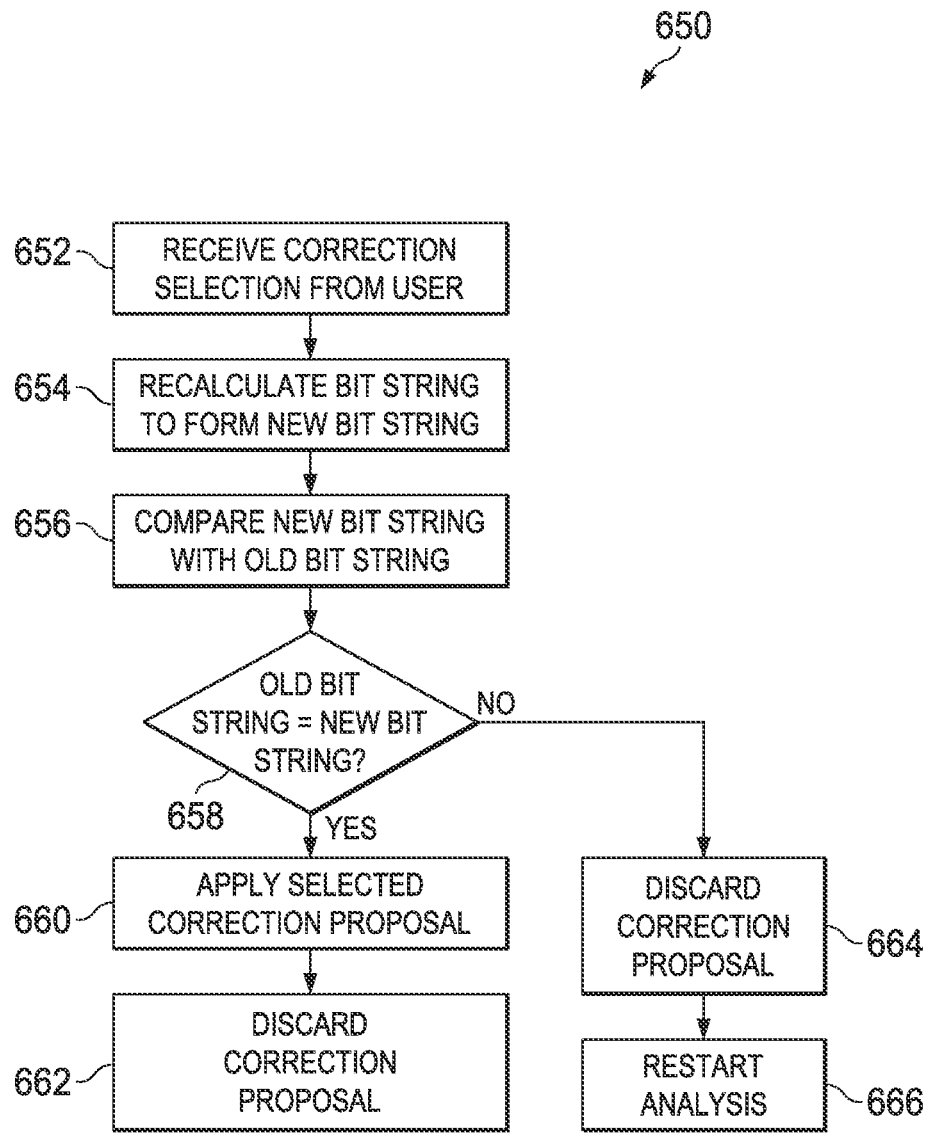
FIG. 6B is a process flow chart for implementing user-selected correction proposals.

FIG. 6B is a process flow chart 650 for implementing user-selected correction proposals. A user confirmation for a correction proposal can be received (652). If correction proposal was not yet applied (i.e., it is still present in the model), the fingerprint of the model portion can be re-calculated upon which to apply the correction (654). The old bit string can be compared to the newly recalculated bit string (656). A determination can be made as to whether the old bit string is the same as the new bit string (i.e., whether, during the pendency of the user confirmation of a correction, the process model has changed) (658). Semantically, when work is performed interactively, a model should not be fixed by a second user (such as another user concurrently editing the same process model) while a first user is contemplating about which correction proposal to apply. Using fingerprints is one way of efficiently performing that check. Alternatives exist, ranging from locking the to-be-altered process model for the duration or interactively selecting a correction proposal or comparing the model fragment at the time the correction proposal was prepared with its current state by creating and storing a snapshot of the model when the correction proposal was prepared and plainly traversing the current model and the snapshot, searching for any differences.

If a newly calculated fingerprint differs from a stored (old) fingerprint, the correction proposal can be discarded (664). Normally, the process described in FIG. 6A is triggered again to check whether the process model which has changed violates any other constraints. The analysis would restart to determine whether the process model has changed, how it has changed, whether there are constraint violations, and if so, what they are (666). Otherwise, the correction proposal can be applied (660) and then discarded (662).

The correction framework can be embedded into different types of design-time environments. Such environments include, but are not limited to, traditional, single-user systems, connected to a source code versioning system (e.g., NetWeaver BPM) and collaborative system, connected to a joint/federated model repository (like SAP Gravity).

Error situations may be ambiguous. Some situations may (in rare cases) be intentional. Error situations can be marked with different severities, such as "error," which will lead to a problem at runtime, and "warning," which, in many cases, will lead to a problem at runtime and may deviate from best practices. Consequently, some problems may be tolerated by the modeling environment.

Problem corrections can be unambiguous (i.e., a single fix that rectifies the problem). The system can apply the fix, e.g., if severity is "error." Problem fixes can be ambiguous (i.e., multiple different fixes that rectify the problem but lead to different process semantics). In those cases, a user can select the fix, e.g., for all severities. Correction proposals can be related to "root cause" artifact (model element that causes the problem). Also, correction proposals can be applicable to unchanged model fragments.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method for providing corrections for semantic errors in a process model, the method comprising:
identifying a change in the process model, the process model including one or more process model elements;
identifying one or more constraint violations associated with at least one process model element in response to identifying the change in the process model;
identifying one or more correction proposals for each constraint violation identified;
creating a first bit string representative of the at least one process model element;
receiving a user selection of a correction proposal from the one or more identified correction proposals;
creating a second bit string of a current version of the at least one process model element;
applying the selected correction proposal in response to determining that the first bit string is the same as the second bit string; and
discarding the selected correction proposal in response to determining that the second bit string differs from the first bit string.

2. The computer implemented method of claim 1 further comprising:
identifying a severity of the constraint violation; and
automatically applying at least one correction proposal for constraint violation severities that indicate a run-time error.

3. The computer implemented method of claim 1 further comprising:
identifying a severity of the constraint violation; and
requesting approval of at least one correction proposal for constraint violation severities that indicate that a run-time error is possible.

4. The computer implemented method of claim 1, wherein the bit string is a fingerprint of a process model fragment, uniquely representing a state of the process model fragment.

5. The computer implemented method of claim 1, wherein the bit string is a checksum.

6. A system for providing corrections for semantic errors in a process model, the system comprising:
a memory for storing instructions; and
at least one hardware processor configured to execute instructions, the instructions comprising:
identifying a change in the process model, the process model including one or more process model elements;
identifying one or more constraint violations associated with at least one process model element in response to identifying the change in the process model;
identifying one or more correction proposals for each constraint violation identified;
creating a first bit string representative of the at least one process model element;
receiving a user selection of a correction proposal from the one or more identified correction proposals;
creating a second bit string of a current version of the at least one process model element;
applying the selected correction proposal in response to determining that the first bit string is the same as the second bit string; and
discarding the selected correction proposal in response to determining that the second bit string differs from the first bit string.

7. The system of claim 6, wherein the instructions further comprise:
identifying a severity of the constraint violation; and automatically applying at least one correction proposal for constraint violation seventies that indicate a run-time error.

8. The system of claim 6, wherein the instructions further comprise:
identifying a severity of the constraint violation; and
requesting approval of at least one correction proposal for constraint violation seventies that indicate that a run-time error is possible.

9. The system of claim 6, wherein the bit string is a fingerprint of a process model fragment, uniquely representing a state of the process model fragment.

10. The system of claim 6, wherein the bit string is a checksum.

11. A non-transitory, computer-readable medium storing computer-readable instructions executable by a computer, the instructions operable when executed to: identify one or more constraint violations in a process model, the process model including one or more process model elements, the one or more constraint violations associated with at least one process model element; identify one or more correction proposals for each constraint violation identified; create a first bit string representative of the at least one process model element; receive a user selection of a correction proposal from the one or more identified correction proposals; create a second bit string of a current version of the at least one process model element; apply the selected correction proposal in response to determining that the first bit string is the same as the second bit string; and discard the selected correction proposal in response to determining that the second bit string differs from the first bit string.

12. The non-transitory, computer-readable medium of claim 11, wherein the operations further comprise instructions are further operable when executed to: identify a severity of the constraint violation; and automatically apply at least one correction proposal for constraint violation severities that indicate a run-time error.

13. The non-transitory, computer-readable medium of claim 11, wherein the instructions further comprise: identify a severity of the constraint violation; and request approval of at least one correction proposal for constraint violation severities that indicate that a run-time error is possible.

\* \* \* \* \*